BEST AVAILABLE COPY
J. L. Mott.
Heating Stove.
8.984x
Patented Jul. 21, 1835.
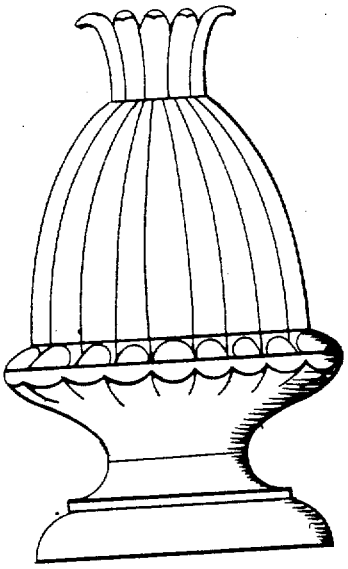
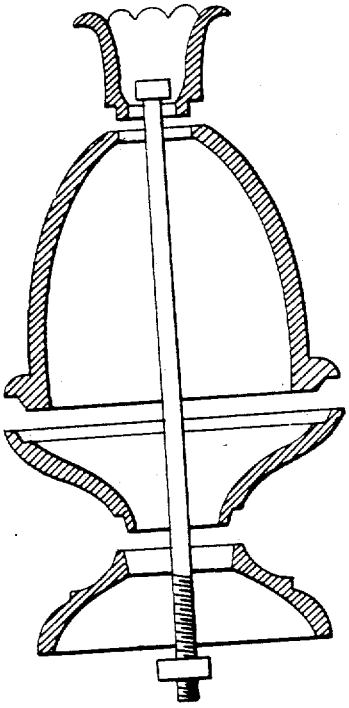
N. PETERS, PHOTO-LITHOGRAPHER, WASHINGTON, D. C.

8984X

July 21 1835 | 29

Jordan L. Mott . New York City

Letters Patent

The Schedule referred to in these Letters Patent and making part of the same containing a description in the words of the said Jordan L. Mott of his improvement in the manufacture of Knobs or Handles to be applied to Stoves and Grates.

To all whom it may concern. Be it known that I Jordan L. Mott of the City of New York in the State of New York have invented or discovered a new and improved manufacture of Knobs or handles to be applied to Stoves and grates of various descriptions and to other purposes. and I do hereby declare that the following is a full and exact description thereof.
My new manufacture consists in the employment of a material for making Knobs or handles used for the above named purpose which material is the metal denominated zinc or Spelter. I cast such Knobs or handles either in moulds of metal or in sand and in separate hollow pieces and unite the same together by means of pins or screws passing through them in the manner commonly pursued in uniting the parts of brass and other Knobs employed for drawers and other purposes. What I claim as my invention is the manufacturing of Knobs or handles used about grates and Stoves and for other purposes which have heretofore been made of brass from zinc or spelter as above described by which the cost of them is much diminished whilst they are equally well adapted to the intended purpose. the same not having been previously done. June 1835

Witness
John Davison
Thomas H. Mills

Jordan L. Mott

Exd. W.K.

286 words (July 21. 1835.)

(Drawing.)